United States Patent [19]

Kountz

[11] 4,132,086
[45] Jan. 2, 1979

[54] TEMPERATURE CONTROL SYSTEM FOR REFRIGERATION APPARATUS

[75] Inventor: Kenneth J. Kountz, Hoffman Estates, Ill.

[73] Assignee: Borg-Warner Corporation, Chicago, Ill.

[21] Appl. No.: 773,379

[22] Filed: Mar. 1, 1977

[51] Int. Cl.² .............................................. F25B 1/00
[52] U.S. Cl. ...................................... 62/209; 62/228; 62/229
[58] Field of Search ................. 62/211, 209, 229, 216, 62/228

[56] References Cited

U.S. PATENT DOCUMENTS 3,803,863   4/1974   Jednacz et al. ........................ 62/209

Primary Examiner—William E. Wayner
Attorney, Agent, or Firm—James E. Tracy

[57] ABSTRACT

A controlled space is maintained at a desired set point temperature by adjusting the evaporator boiling pressure in a refrigeration system, thereby controlling the evaporator capacity (namely, the amount of cooling imparted to the air supplied to the space) which is inversely proportional to the evaporator boiling pressure. When the space temperature tends to vary from the desired set point due, for example, to a changing heat load, the control system automatically changes the refrigerant flow through the evaporator to establish the evaporator boiling pressure (and hence the boiling temperature) at the control point required to cool the air sufficiently to maintain the controlled space at the desired temperature. More specifically, in response to a space temperature increase, the flow rate of the refrigerant increases to decrease the evaporator boiling pressure; and in response to a drop below the set point, the refrigerant flow decreases to increase the evaporator boiling pressure. Such control of the flow rate, and consequently the evaporator boiling pressure, is achieved by varying the displacement of a controlled displacement compressor included in the refrigeration system. When the heat load on the evaporator is constant, the refrigerant flow is automatically controlled in order to hold the evaporator boiling pressure fixed at the required control point.

23 Claims, 2 Drawing Figures

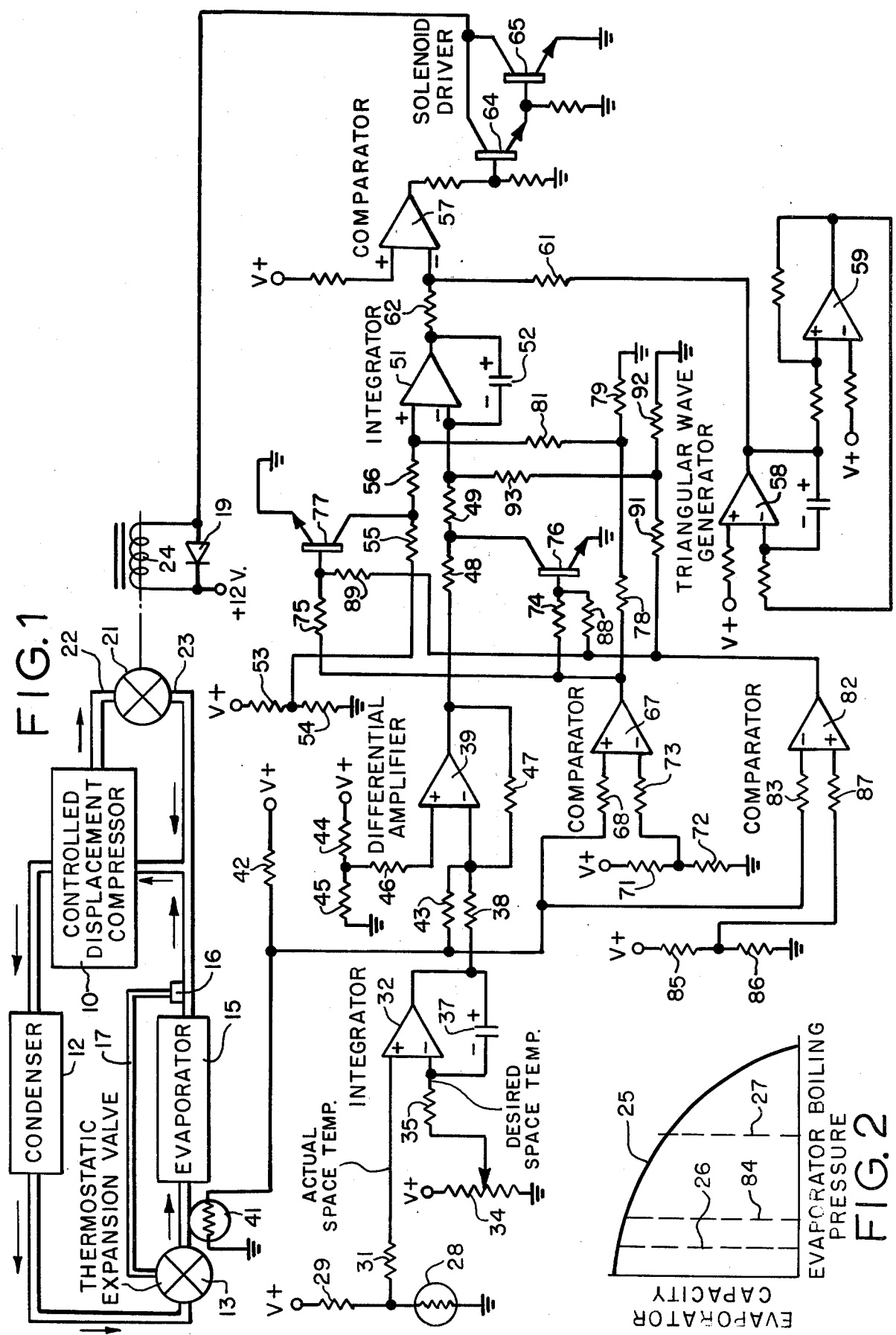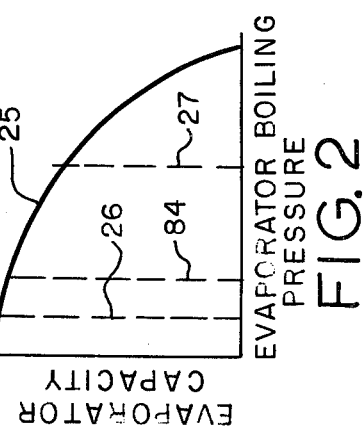

TEMPERATURE CONTROL SYSTEM FOR REFRIGERATION APPARATUS

BACKGROUND OF THE INVENTION

This invention relates to a control system for controlling the operation of a refrigeration system, particularly an automotive air-conditioning system, to maintain a cooled space at a constant desired temperature.

Air-conditioning systems for automotive vehicles, such as automobiles, trucks and buses, are subject to widely varying operating conditions (for example, heat loads and compressor speeds), and are usually inefficient in that their system capacities do not always match their loads. Such inefficient operation wastes energy and significantly affects the vehicle's fuel consumption. The control arrangement of the present invention, on the other hand, controls the operation of a refrigeration system in a unique way so that the system capacity is regulated to just meet the needs of the vehicle compartment to be cooled. By maintaining a correct balance between system capacity and refrigeration load at all times, no energy is wasted and fuel economy is enhanced.

Moreover, with the present invention the evaporator pressure is maintained as high as possible while still satisfying the heat load requirements, thereby minimizing the discharge pressure/suction pressure ratio across the compressor. Since the power needed to drive the compressor is directly proportional to the ratio of the discharge pressure relative to the suction pressure, maximizing the evaporator preesure (and thus the suction pressure) permits the compressor to operate at maximum efficiency.

SUMMARY OF THE INVENTION

The control system of the invention is incorporated in a refrigeration system where refrigerant flows through a closed vapor cycle refrigeration circuit having an evaporator, a controlled displacement compressor, a condenser and a thermostatic expansion device. The operation of the refrigeration system is controlled to vary the evaporator boiling pressure (or boiling temperature), and consequently the capacity of the evaporator, in order to maintain a substantially constant desired temperature in a space to which cooled air is supplied by the refrigeration system. The control system comprises first monitoring means for monitoring the ambient temperature in the space to be temperature controlled, and second monitoring means for monitoring the pressure of the refrigerant flowing through the evaporator. Control means respond to both the first and second monitoring means for varying the displacement of the controlled displacement compressor to modulate the refrigerant flowing through the evaporator to adjust the evaporator boiling pressure as required to maintain the controlled space at the desired temperature.

DESCRIPTION OF THE DRAWING

The features of the invention which are believed to be novel are set forth with particularity in the appended claims. The invention, together with further advantages and features thereof, may best be understood, however, by reference to the following description in conjunction with the accompanying drawing in which:

FIG. 1 schematically illustrates a control system, constructed in accordance with one embodiment of the invention, and the manner in which it is incorporated in a refrigeration system, shown specifically as an automotive air-conditioning system, and FIG. 2 is a characteristic curve that will be helpful in understanding the operation of the control system.

DESCRIPTION OF THE ILLUSTRATED EMBODIMENT

The disclosed air-conditioning system includes a controlled displacement compressor 10, a condenser 12, a thermostatic expansion device or valve 13 and an evaporator 15, the four components being intercoupled in series to form a conventional closed vapor cycle refrigeration circuit. Refrigerant gas is compressed in compressor 10 and supplied to condenser 12 where it is condensed to liquid refrigerant and delivered to thermostatic expansion device 13. The refrigerant expands as it flows through device 13 and emerges as a two-phase mixture of liquid and gas but primarily a liquid. As the two-phase mixture then flows through evaporator 15, which is in heat exchange relation with air supplied to the vehicle compartment space to be cooled, heat is transferred from the air to the refrigerant and the entirety of the refrigerant vaporizes and assumes its gaseous state. The refrigerant gas at the evaporator outlet is then passed to the suction inlet of the compressor.

Thermostatic expansion valve 13, which is of conventional construction, maintains a safe and a constant margin of evaporator outlet superheat under all operating conditions. In well-known manner, the size of the valve opening in device 13 is determined conjointly by the evaporator pressure (sensed internally in device 13) and by the evaporator outlet temperature which is fed back to the device, by means of pressure fluid, from temperature sensing bulb 16 which is attached to the evaporator outlet and connects to valve 13 via capillary tube 17. The opening of the expansion valve, and consequently the refrigerant flow, is an inverse function of the evaporator pressure and a direct function of the evaporator outlet temperature. The superheat setting of valve 13 will remain substantially constant regardless of the absolute level of the evaporator pressure. In other words, even though the evaporator boiling pressure may be purposely varied, as is the case in the present invention, the amount of superheat will remain fixed at a desired level. Preferably, the amount of superheat added should be relatively small so that the refrigerant remains a two-phase, liquid/gas mixture throughout almost the entire evaporator to achieve optimum heat transfer to the refrigerant from the air to be cooled. In this way, thermostatic expansion valve 13 insures that evaporator 15 is used most effectively regardless of the value of the evaporator boiling pressure. Of course, the refrigerant should be vaporized completely and converted entirely to gas before it reaches the outlet of the evaporator so that no refrigerant liquid flows through the suction line and into the compressor, possibly causing structural damage thereof.

In order to adjust the evaporator boiling pressure (and hence the boiling temperature), thereby to change the evaporator capacity and the amount of cooling imparted to the air, the flow rate of the refrigerant through the refrigeration circuit is controlled by varying the displacement of compressor 10. By changing the displacement, the compressor capacity is varied and consequently the refrigerant flow rate changes. Preferably, compressor 10 is constructed as illustrated and described in detail in U.S. Pat. No. 3,861,829, issued Jan.

21, 1975 in the name of Richard W. Roberts et al., and assigned to the present assignee. In the compressor shown in that patent the pressure in a crankcase cavity, which is vented to the compressor's suction inlet, determines the stroke of a plurality of pistons which in turn determines the compressor displacement and capacity. The crankcase is pressurized by the leakage of high pressure gas past the pistons (called piston blow-by) and into the crankcase, and by regulating the escape of the blow-by gas from the crankcase through the vent to the suction line, the crankcase pressure may be changed to vary the stroke of the pistons and thus the compressor displacement. As described in the Roberts et al. patent, the crankcase pressure is controlled by varying a stroke control valve in the vent to provide an adjustable restriction or orifice therein. The greater the restriction in the vent line, the greater the crankcase pressure and the lower the stroke and the displacement. In other words, the displacement varies inversely with the crankcase pressure. As taught in the Roberts et al. patent, the crankcase pressure is preferably between five and ten percent of the difference between suction and discharge pressure.

In the illustrated embodiment of the present invention, the crankcase pressure, and hence the stroke, in compressor 10 are adjusted by means of a solenoid operated stroke control valve 21, the inlet of which is connected via line 22 to the crankcase while the outlet of the valve connects through line 23 to the compressor's suction inlet. By controlling the energization of solenoid coil 24 (by a pulse width modulated signal in a manner to be described), stroke control valve 21 may be modulated to effectively interpose a variable orifice between lines 22 and 23. Coil 24 is alternately energized and de-energized, namely cycled on and off, in response to the pulse width modulated signal. The greater the energization of coil 24 (namely the greater the duty cycle which is the ratio of each energized interval relative to the time duration or period of a complete cycle), the less restriction introduced by valve 21, the lower the crankcase pressure and the greater the stroke. Hence, the displacement of compressor 10, and consequently the flow rate of the refrigerant through the refrigeration circuit (and thus through the evaporator), are directly proportional to the duty cycle of coil 24. Diode 19 merely provides a circuit path in shunt with coil 24 to dissipate energy developed in the coil.

Before the control system for coil 24 is discussed, it will be helpful to consider the characteristic curve 25 of FIG. 2 which plots the evaporator capacity (on the ordinate or y-axis) as a function of the boiling pressure of the refrigerant in the evaporator (on the abscissa or x-axis). As illustrated by curve 25, the two characteristics are inversely related. As the evaporator boiling pressure in increased, the capacity of the evaporator reduces and the amount of cooling imparted to the air decreases. To explain, the evaporator boiling temperature, which is directly proportional to the boiling pressure, is the coldest temperature in the system, and the cooling effect on the air passing over the evaporator is a function of that boiling temperature. The colder the boiling temperature (and thus the lower the boiling pressure), the greater the amount of cooling imparted to the air. The evaporator boiling pressure and evaporator capacity are, therefore, inversely proportional to each other.

As mentioned, the evaporator boiling pressure may be controlled by varying the refrigerant flow rate through the evaporator. Specifically, the evaporator boiling pressure is an inverse function of the flow rate. The greater the refrigerant flow, the lower the boiling pressure and the greater the evaporator capacity. Thus, to maximize the cooling effect of the evaporator, the refrigerant flow rate should be maximized. However, there is a desired minimum limit for the evaporator boiling pressure. The refrigerant flow rate should be controlled so that the boiling pressure does not drop below that desired minimum. Otherwise, the evaporator would be so cold that freeze-up may occur. On the other hand, there is also a desired upper or maximum allowable level for the evaporator boiling pressure in order to insure that proper dehumidification of the cooled air occurs even when the heat load is relatively small.

Dashed construction line 26 in FIG. 2 designates the desired minimum evaporator boiling pressure in the illustrated embodiment. The intersection of that dashed line with curve 25 thus indicates the maximum evaporator capacity at which the system will operate. When the flow rate of the refrigerant is adjusted so that the evaporator boiling pressure is at the desired minimum, maximum cooling will occur while avoiding evaporator freeze-up. Dashed construction line 27 indicates the maximum allowable boiling pressure, which will provide minimum cooling but will be sufficient to properly dehumidify the air. As will be seen, the evaporator boiling pressure, at which the refrigeration system operates, will automatically be selected, between the limits defined by lines 26 and 27, so that the refrigeration capacity is matched to the heat load at all times to provide the most efficient manner of operation and to expend the least energy. For convenience, the selected desired evaporator boiling pressure along the abscissa in FIG. 2 will be referred to as the control point pressure. In a manner to be explained, the refrigerant flow through the evaporator will automatically be regulated to establish the evaporator boiling pressure at the appropriate control point, along the abscissa, required to maintain the vehicle compartment space at the desired space temperature.

Turning now to the control system, a temperature sensor, in the form of a thermistor 28, is located in the vehicle compartment space to be air conditioned. For example, sensor 28 may be located near the vehicle's dashboard. One terminal of sensor 28 is connected to a ground plane of reference potential while its other terminal is connected through a resistor 29 to a source of positive DC voltage labelled V+. Preferably, the magnitude of that DC voltage is around +10 volts and the ground plane of reference potential is zero volts. Of course, all of the terminals in the drawing marked "V+" are tied or connected to the same DC power source. Thermistor 28 has a negative temperature coefficient so that its resistance is an inverse function of the actual temperature of the compartment space which is to be controlled. In other words, if the space temperature increases, for example, the resistance of thermistor 28 decreases and the voltage at the junction of sensor 28 and resistor 29 decreases.

The junction of temperature sensor 28 and resistor 29 connects through a resistor 31 to the non-inverting or (+) input of integrated circuit operational amplifier (IC op amp) 32 which preferably is a type 3401 current mode Norton amplifier. Actually, all of the other IC op amps shown in the drawing (namely those amplifiers designated by the reference numbers 39, 51, 57, 58, 59, 67 and 82) are also preferably type 3401 amplifiers. While not specifically illustrated, each of the op amps is connected to the V+ power supply so that its operating voltage will be +10 volts.

A type 3401 Norton amplifier requires input currents at its inputs rather than input voltages. For this reason, resistor 31 and all of the other corresponding or equivalent resistors in series with the inputs to the operational IC amplifiers are needed to convert from input voltages to input currents. As is also characteristic of a Norton amplifier, good signal isolation is provided for summing terms since both of its inputs are at virtually ground or zero potential. Moreover, a Norton amplifier, with the addition of a polarized capacitor between its output and its inverting or (−) input, forms an integrator circuit wherein the output voltage is always positive with respect to the voltages at the inputs. As will be appreciated, all of the signal voltages in the control system will be positive with respect to ground.

Since the voltage at the junction of thermistor 28 and resistor 29 varies inversely with the actual ambient temperature of the air-conditioned space in the vehicle, the current signal supplied to the (+) input of amplifier 32 likewise varies as an inverse function of the actual space temperature and thus represents that space temperature. The desired set point temperature for the compartment space may be established, usually by the driver of the vehicle, merely by manipulating an adjustable device in the form of a potentiometer 34 which, of course, is preferably mounted on the dashboard. Hence, the combination of thermistor 28 and potentiometer 34 effectively constitutes a thermostat. A current signal will thus be supplied through series resistor 35 to the inverting or (−) input of amplifier 32. The amplitude level of this input current (which may be called the temperature set point signal since it represents the desired space temperature) will be directly proportional to the set point selected or thermostat setting. The higher the desired space temperature, the greater the current flowing into the (−) input.

The Norton type amplifier functions as a differential amplifier in that the output voltage is proportional to the difference between the two input current signals. Because of the presence of polarized capacitor 37, amplifier 32 also serves as an integrator. If the current entering the (+) input of amplifier 32 is greater than that flowing into the (−) input, the output voltage increases gradually in a positive direction (namely it integrates or sweeps upwardly to form a ramp shaped waveform) to an amplitude level determined by the difference between the two input signals. If there is then a change in either of the input signals such that the current supplied to the (−) input becomes greater than the current into the (+) input, the output voltage decreases gradually in a negative direction (namely it sweeps or integrates downwardly) toward zero or ground potential. As mentioned, the output voltage of amplifier 32 can never drop below the voltage at the two inputs which are essentially at ground potential.

Amplifier 32 thus compares the space temperature signal and the temperature set point signal to produce an output voltage signal which varies as a function of the difference between the actual and desired space temperatures. This voltage signal is converted by series resistor 38 to a current signal for application to the (−) input of amplifier 39. As will be made apparent, the current signal flowing through resistor 38 and into the (−) input effectively represents the desired evaporator boiling pressure, referenced with respect to the predetermined desired minimum evaporator boiling pressure, and may thus be called the pressure control point signal since it indicates the desired control point on the abscissa of FIG. 2 where the system should operate in order to properly cool the controlled space. In other words, the control point pressure is a function of the output of amplifier 32.

A temperature sensor, in the form of a thermistor 41, is physically attached to or positioned adjacent to the evaporator inlet in heat exchange relation so as to monitor the temperature of the refrigerant before it flows into the evaporator. Since the refrigerant at the evaporator inlet is a two-phase fluid, the temperature measured by thermistor 41 reflects the evaporator pressure. Hence, sensor 41 effectively monitors the pressure of the refrigerant flowing through the evaporator. Of course, instead of sensing the evaporator inlet temperature, a pressure transducer could be employed at the evaporator outlet. For economy, a thermistor at the evaporator inlet is preferred.

Sensor 41 is similar to sensor 28 in that it also has a negative temperature coefficient so that its resistance is inversely proportional to the evaporator refrigerant outlet temperature. If the temperature (or pressure) of the refrigerant decreases, for example, the resistance of thermistor 41 increases and the voltage at the junction of resistor 42 and temperature sensor 41 increases. The voltage signal produced at the junction thus represents the actual evaporator pressure and the amplitude of this voltage signal varies inversely with that pressure. By virtue of series resistor 43, the voltage signal is converted to a current signal and supplied to the (−) input of amplifier 39. The current flowing through resistor 43 may therefore be referred to as the evaporator pressure signal. Since there are two signals fed to the (−) input of amplifier 39, a summation or addition of those signals occurs at the input. As will be appreciated, if the compartment space becomes colder than desired or if the evaporator pressure decreases below the desired control point, the effect on amplifier 39 will be the same.

The voltage divider comprising resistors 44 and 45 provides a reference voltage, at the junction of those resistors, which is converted by series resistor 46 to an input current for the (+) input of amplifier 39. The current signal serves as a reference signal whose amplitude represents the desired minimum boiling pressure for the refrigerant flowing through the evaporator. In the illustrated case, the level of the reference signal is such that during normal operation of the air-conditioning system the evaporator boiling pressure is prevented from dropping below the desired minimum denoted by dashed line 26 in FIG. 2.

Amplifier 39 functions primarily as a differential amplifier, its response characteristics being determined by feedback resistor 47. Except when the control system is operating at the control point denoted by dashed line 26, the amplifier's output voltage, which is always a positive voltage between zero and +10 volts and may be called the error voltage signal, varies above (in a positive direction) and below (in a negative direction) with respect to a reference level depending on the difference between the input currents. The error voltage signal therefore varies as a function of the difference between the desired control point pressure, the actual evaporator pressure and the desired minimum evaporator pressure. The reference level of the error signal at the output of amplifier 39 varies as the control point pressure changes, so each time a new control point is selected along the abscissa in FIG. 2 the error signal stabilizes around a new reference level.

When the control system is operating at the control point indicated by dashed line 26, the input signals to amplifier 39 will be such that the reference level will have its maximum amplitude and the error signal will be limited to that amplitude. At other times when the control system is operating at some control point to the right of dashed line 26, the error signal is permitting to vary above and below the reference level.

Under steady state conditions, the input currents supplied to amplifier 39 will be constant and have a fixed relationship to hold the error signal at the required reference level. If the current entering the (−) input of amplifier 39 then increases, the error signal decreases below its reference level. On the other hand, if the input current at the (−) input decreases, the output voltage of amplifier 39 increases above the reference level.

A pair of series-connected resistors 48 and 49 convert the error voltage signal to an error current signal for application to the inverting or (−) input of amplifier 51 which, due to the inclusion of polarized capacitor 52, serves as an integrator. Current is fed into the (+) input by means of resistors 53, 54, 55 and 56 to set the bias level for amplifier 51. The output of amplifier 51 varies from essentially zero potential to V+ (+10 volts in the illustrated case) as determined by the amplitude of the error signal supplied to the amplifier's (−) input. Of course, since amplifier 51 is an integrator, anytime there is a change in the magnitude of the error signal the output of the amplifier does not change abruptly but rather increases or decreases gradually.

A pulse width modulated signal is produced having a waveshape dependent on the output of amplifier 51. To explain, such a signal is rectangular shaped, containing periodically recurring positive-going pulse components with intervening negative-going pulse components. The frequency will be constant but the relative widths of the positive and negative pulse components will vary depending on the output signal of amplifier 51. As the width or duration of each positive pulse component increases, each negative pulse component decreases proportionately, and vice-versa. In other words, since the period or time duration of a complete cycle is constant, when the duration of a positive pulse component changes in one sense the width of the immediately succeeding negative pulse component must change in the opposite sense. The pulse width modulated signal has a duty cycle characteristic which is the ratio of the width of each positive-going pulse compared to the duration of a complete cycle. As will be made apparent, the duty cycle of the pulse width modulated signal is the same as the energizing or operating duty cycle of solenoid coil 24.

The pulse width modulated signal is developed at the output of amplifier 57 which functions as a comparator. Amplifiers 58 and 59, and their associated circuit elements, form a well-known triangular wave generator or oscillator for supplying a triangular shaped signal through series resistor 61 to the (−) input of amplifier 57. Preferably, the frequency of the signal is around four cycles per second or hertz. In addition, the voltage signal at the output of amplifier 51 is applied, via resistor 62, as a current signal to the (−) input. Summation of the two current signals occurs at the (−) input. In other words, the triangular wave is essentially superimposed on the output signal from amplifier 51. A fixed reference level is established at the (+) input of amplifier 57. The net current flowing into the (−) input varies alternately (at the frequency of the triangular wave) above and below the level of the reference current entering the (+) input. Each time the input current at the (−) input drops below the input current at the (+) input, the output voltage of amplifier 57 abruptly switches from ground or zero to V+ or +10 volts, where it remains until the current at the (−) input becomes greater than the reference current at the (+) input. At that instant, the output voltage switches from its high level back to its low level or zero. The greater the current flowing from the output of amplifier 51, the greater the time intervals during which the output of amplifier 57 is established at zero potential, and the smaller the time intervals when the output is at its high potential level. In this way, the output of amplifier 57 provides a pulse width modulated, rectangular shaped signal having a 10 volt peak-to-peak amplitude, the relative widths of the alternating positive-going and negative-going pulses being modulated under the control of amplifier 51. The duty cycle of the pulse width modulated signal is the ratio of the time interval of one positive pulse component compared to a complete cycle, namely the total time duration of one positive pulse component and one negative pulse component.

The pulse width modulated signal operates the solenoid driver, comprising transistors 64 and 65 and their associated circuit elements, to effectively apply that signal to solenoid coil 24. Preferably, the +12 volts at the left terminal of coil 24 is derived from the vehicle's voltage regulator. During each positive-going pulse when the output of amplifier 57 is established at its high level, transistors 64 and 65 conduct and the right terminal of coil 24 will be essentially grounded, thereby applying a full 12 volts DC across the coil. During the intervening negative-going pulses, when the output of amplifier 57 is at its low or zero level, transistors 64 and 65 will be non-conductive and coil 24 will be de-energized. Since coil 24 is energized only by the positive-going pulses, it is apparent that the duty cycle of coil 24 is the same as, and is determined by, the duty cycle of the pulse width modulated signal. The greater the duty cycle, the less the restriction introduced by valve 21 between lines 22 and 23, the lower the crankcase pressure, and the greater the compressor displacement. Since the duration of the intervals, when the output of amplifier 57 is at its high level, is inversely proportional to the output signal of amplifier 51, the duty cycle, and consequently the compressor displacement, likewise vary inversely with the output of amplifier 51.

Under normal conditions, the input current at the (+) input of amplifier 39 prevents the evaporator boiling pressure from decreasing below the desired minimum indicated by dashed line 26 in FIG. 2. Since the compressor in an automotive air-conditioning system is usually driven or rotated by the vehicle's engine, during high speed operation (for example, during downshift conditions when there is a rapid increase in engine speed) the refrigerant flow rate will increase and the evaporator pressure may drop below the desired minimum. In order to prevent the pressure from dropping so low that evaporator freeze-up occurs or liquid refrigerant is fed into the suction inlet of the compressor, a protection circuit is included in the control system. More particularly, an amplifier 67, which operates as a comparator, has its non-inverting or (+) input connected through series resistor 68 to receive the evaporator pressure signal. Resistors 71, 72 and 73 supply to the inverting or (−) input a reference current signal which represents an absolute minimum level allowed for the evaporator boiling pressure. This pressure will, of course, be below the desired minimum, and thus will be to the left of dashed line 26 in FIG. 2. Thermostatic expansion valve 13 will insure that even at such a low evaporator pressure, the refrigerant will still be superheated so that all of the refrigerant liquid flowing through the evaporator vaporizes.

Under normal conditions, the current entering the (+) input of amplifier 67 will be less than the reference current flowing into the (−) input and the output of the amplifier will be at essentially zero or ground potential. If the evaporator pressure drops to the absolute minimum level, the current into the (+) input will then be greater than that fed into the (−) input and the output voltage of amplifier 67 will abruptly switch from zero to V+ or +10 volts. This output voltage is applied through resistors 74 and 75 to the bases of transistors 76 and 77, respectively. Resistors 78, 79 and 81 convert the output voltage to an input current for the (+) input of amplifier 51. When the output of amplifier 67 is V+, transistors 76 and 77 will be rendered conductive thereby grounding the junction of resistors 55 and 56 and also the junction of resistors 48 and 49. At the same time, current is supplied to the (+) input of amplifier 51 of an amplitude sufficient to cause the output of the amplifier to integrate upwardly (or positively) to V+ where it levels off.

In the presence of a relatively small heat load, the vapor evaporator boiling pressure is prevented from exceeding its upper limit (denoted by dashed line 27 in FIG. 2) by means of another protection circuit. At the maximum allowable level, adequate dehumidification of the air passing over the evaporator will still occur. Specifically, an amplifier 82, which functions as a comparator, has its inverting or (−) input connected through series resistor 83 to the junction of thermistor 41 and resistor 42 to receive therefrom the evaporator pressure signal. Resistors 85, 86 and 87 supply to the non-inverting or (+) input of amplifier 82 a reference current signal which represents the predetermined maximum allowable level for the evaporator boiling pressure. Under normal conditions, the current entering the (−) input of amplifier 82 will be greater than the reference current flowing into the (+) input, and the output of the amplifier will be at essentially ground or zero potential. If the evaporator pressure then increases to the maximum allowable level, the current into the (−) input will be less than that fed into the (+) input and the output voltage of amplifier 82 will abruptly switch from zero to V+ or +10 volts. This output voltage is applied through resistors 88 and 89 to the bases of transistors 76 and 77, respectively. Resistors 91, 92 and 93 convert the output voltage to an input current for the (−) input of amplifier 51. When the output of amplifier 82 is V+, transistors 76 and 77 will be rendered conductive thereby grounding the junction of resistors 55 and 56 and also the junction of resistors 48 and 49. At the same time, current is supplied to the (−) input of amplifier 51 of an amplitude sufficient to cause the output of the amplifier to integrate downwardly (or negatively) to a predetermined voltage level which will cause the evaporator pressure to remain at the maximum limit until the operating conditions change, such as the heat load increases.

In describing the operation of the control system it will be assumed that when the air-conditioning apparatus is initially turned on the ambient temperature in the vehicle compartment space to be air-conditioned is substantially higher than the desired set point temperature established by the thermostat setting, namely by the adjustment of potentiometer 34. At this time, the current entering the (−) input of amplifier 32 will be substantially greater than the current into the (+) input, thereby causing the output of the amplifier to remain at essentially zero voltage. Meanwhile, since the evaporator pressure is relatively high at start-up the voltage at the junction of temperature sensor 41 and resistor 42 will be relatively low. Hence, both the pressure control point signal (flowing through resistor 38) and the evaporator pressure signal (flowing through resistor 43) will be of low amplitude and substantially less than the reference current (which represents the desired minimum evaporator pressure) entering the (+) input of amplifier 39. As a result, the error voltage signal produced at the output of amplifier 39 will be established at its maximum level, thereby causing the error current signal entering the (−) input of amplifier 51 to be substantially greater than the current into the (+) input. At this time transistors 76 and 77 are non-conductive since the output voltages of amplifiers 67 and 82 will be zero. The output of amplifier 51 thus remains at zero potential, as a consequence of which the pulse width modulated signal developed at the output of amplifier 57 will exhibit its maximum duty cycle which in turn causes compressor 10 to operate at its maximum displacement, thereby to maximize the refrigerant flow through the closed vapor cycle refrigeration circuit. The high refrigerant flow rate causes the evaporator pressure to decrease until it reaches the desired minimum, as denoted by dashed line 26. When that occurs, the current entering the (−) input of amplifier 39 automatically adjusts in order to hold the evaporator pressure at the desired minimum. If that pressure tends to drop below the desired minimum, the input current at the (−) input increases causing the error signal to decrease and reduce the duty cycle as required to return the evaporator pressure to the desired minimum.

The control system will continue to operate at the control point indicated by dashed line 26 and cooling will be imparted to the air delivered to the controlled space until that space cools down to the desired set point temperature. This cooling down period is sometimes called the "pulldown period". When the desired space temperature is eventually reached, the two input currents to amplifier 32 will be equal and the output will be zero at that instant. However, as the controlled space then becomes slightly colder, the current entering the (+) input of amplifier 32 will exceed that into the (−) input and the output integrates upwardly, thereby increasing the current flowing through resistor 38 and into the (−) input of amplifier 39. The error voltage signal at the output of amplifier 39 therefore decreases to a new reference level, causing the duty cycle to decrease and the refrigerant flow rate to drop so that the controlled space does not become colder than the set point.

Steady state conditions have now been reached and the control system is in balance. The output voltage of amplifier 32 has integrated upwardly from zero to a constant positive level where it will remain as long as the actual space temperature equals the desired space temperature. Since the refrigerant flow rate through the evaporator is now less than that which prevailed during the pull-down period, the evaporator pressure increases and the control point now shifts to the right along the abscissa in FIG. 2. For illustrative purposes it will be assumed that the new control point pressure is that which is indicated by dashed construction line 84. The output of amplifier 32 thus effectively represents the desired evaporator boiling pressure, referenced with respect to the predetermined desired minimum evaporator boiling pressure, since the actual evaporator pressure is a function of the amplitude of the output voltage produced by amplifier 32. Accordingly, the output signal of amplifier 32 may be referred to as the pressure control point signal.

The new control point (dashed line 84) matches the heat load requirements and the control system will stabilize around that control point to automatically hold the controlled space at the desired set point temperature, while at the same time maintaining the compressor displacement and refrigerant flow only as high as necessary to satisfy the heat load. Hence, energy will be conserved and the vehicle's fuel consumption, attributable to powering the air conditioning system, will be minimized. In addition, the evaporator boiling pressure will be as high as possible while still meeting the heat load. This minimizes the discharge pressure/suction pressure ratio across the compressor, thereby improving compressor efficiency. As long as the heat load is constant, and the thermostat remains at the same setting, the output voltage of amplifier 32 will be constant and the error signal will remain at the same reference level. If anything tends to upset or unbalance the steady state conditions, the control system automatically readjusts itself to maintain those conditions.

If there is now an increase in the heat load (assume the outside temperature increases) and the space tends to become warmer than desired, the output voltage of amplifier 32 begins to decrease gradually (namely it integrates downwardly) and the error signal at the output of amplifier 39 increases to a new reference level, thereby to increase the duty cycle and consequently the flow rate of the refrigerant. This lowers the evaporator boiling pressure to return the controlled space to the desired temperature. The control point will now be established to the left of dashed line 84 and the positive output voltage of amplifier 32 will level off at a new amplitude in order to hold the evaporator pressure at the necessary control point. Of course, the same sequence would occur if the driver of the vehicle lowered the thermostat.

On the other hand, if there is a decrease in the heat load, or the driver increases the thermostat setting, the output of amplifier 32 integrates upwardly to a new amplitude level and the refrigerant flow decreases to increase the evaporator boiling pressure (moving the control point to the right) and provide less cooling for the controlled space, as a consequence of which the space will be maintained at the desired temperature.

During steady state conditions when the thermostat setting is not changed and the heat load remains constant, the pressure control point signal produced by amplifier 32 thereby remaining constant, the evaporator boiling pressure will be held fixed at the desired control point. This is achieved in the control system by regulating the refrigerant flow so that the control point always remains fixed if the information received from amplifier 32 is constant. If the evaporator pressure tends to increase, for example, the current flowing through resistor 43 and into the (−) input of amplifier 39 decreases and the output of that amplifier increases to increase the refrigerant flow and maintain the evaporator pressure at the desired control point. Likewise, if the evaporator pressure tends to drop, the output of amplifier 39 decreases to lower the refrigerant flow so that the evaporator pressure remains at the desired control point. Hence, when the heat load requirements that must be satisfied by the evaporator are essentially constant, the control system automatically maintains both the evaporator pressure and the space temperature at constant desired levels, the compressor displacement and refrigerant flow rate being only as high as necessary to maintain these constant conditions.

Of course, since compressor 10 is usually rotated by the vehicle's engine, the RPM of the compressor will be a function of engine speed and the refrigerant flow rate will tend to change as the engine speed varies. The control system, however, automatically compensates for any RPM change. As the refrigerant flow tends to increase, for example, the evaporator pressure decreases and this causes the error signal, at the output of amplifier 39, to decrease, the result of which is that the compressor displacement reduces to the extent necessary to decrease the flow rate to a level that will hold the space temperature at the desired set point. Conversely, in the presence of a reduction in engine speed, the compressor is automatically controlled in order to increase the refrigerant flow as required to maintain the desired space temperature.

Under abnormal conditions when there is a sudden increase in engine speed, such as when the engine is downshifted, the control system operates to prevent the evaporator boiling pressure from dropping below the absolute minimum level, thereby avoiding evaporator freeze-up and also preventing wet vapor from entering the compressor's suction inlet. When the compressor is driven so fast that the evaporator pressure drops to the absolute minimum level allowed (which will be to the left of dashed line 26), the input current at the (+) input of amplifier 67 will exceed the current entering the (−) input, with the result that the output of amplifier 67 switches abruptly from zero volts to V+ or +10 volts. Transistors 76 and 77 immediately conduct and ground the junction of resistors 55 and 56 and the junction of resistors 48 and 49 (thereby overriding the error signal and rendering it ineffective), while at the same time current is supplied to the (+) input of amplifier 51 to cause the output to integrate upwardly and reduce the duty cycle. The flow rate of the refrigerant is thus significantly reduced so that no freeze-up occurs and no unvaporized refrigerant reaches the suction inlet. When the evaporator pressure increases above the absolute minimum, amplifier 67 returns to its normal condition (wherein its output is zero) and normal operation of the control system occurs.

In the event that the heat load decreases to the extent that the evaporator pressure rises to the maximum allowable level indicated by dashed line 27, comparator 82 will be triggered and will cause the compressor to operate with a displacement appropriate to hold the evaporator pressure at that maximum level. More particularly, when the evaporator pressure reaches its upper limit, the input current at the (−) input of amplifier 82 will be less than the current entering the (+) input, as a consequence of which the output of amplifier 82 switches from zero volts to V+. Transistors 76 and 77 conduct thereby grounding the junction of resistors 55 and 56 and the junction of resistors 48 and 49. The error signal is thus rendered ineffective. At the same time, current is supplied, via resistor 93, to the (−) input of amplifier 51 to cause the output thereof to integrate downwardly to a predetermined voltage level that will cause the compressor to have a displacement appropriate to maintain the evaporator pressure at the maximum allowable level. When conditions change such that the evaporator pressure drops, amplifier 82 switches back to its normal operating condition (zero output) and normal operation of the control system occurs.

While a particular embodiment of the invention has been shown and described, modifications may be made, and it is intended in the appended claims to cover all such modifications as may fall within the true spirit and scope of the invention.

I claim:

1. In a refrigeration system where refrigerant flows through a closed vapor cycle refrigeration circuit having an evaporator, a controlled displacement compressor, a condenser and a thermostatic expansion device, a control system for controlling the operation of the refrigeration system to vary the evaporator boiling pressure, and consequently the capacity of the evaporator, in order to maintain a substantially constant desired temperature in a space to which cooled air is supplied by the refrigeration system, comprising:
   means for providing a space temperature signal representing the actual ambient temperature in the space to be temperature controlled;
   means for providing a temperature set point signal representing the desired temperature for the temperature controlled space;
   means for providing an evaporator pressure signal representing the actual pressure of the refrigerant flowing through the evaporator;
   and control means responsive to said space temperature signal, said temperature set point signal, and said evaporator pressure signal for varying the displacement of the controlled displacement compressor to modulate the refrigerant flowing through the evaporator to adjust the evaporator boiling pressure to vary the evaporator capacity as required to maintain the controlled space at the desired temperature.

2. A control system according to claim 1 wherein the pressure of the refrigerant in the evaporator is monitored by means of a thermistor which senses the temperature of the refrigerant at the evaporator inlet.

3. A control system according to claim 1 and including protection means for limiting the evaporator boiling pressure to a predetermined absolute minimum level to avoid evaporator freeze-up.

4. A control system according to claim 1 and including additional protection means for limiting the evaporator boiling pressure to a predetermined maximum allowable level to insure that proper dehumidification of the cooled air occurs even when the heat load is relatively small.

5. A control system according to claim 1 wherein the displacement of the compressor is controlled by a pulse width modulated signal produced by said control means, the refrigerant flow rate established by the compressor being determined by the signal's duty cycle.

6. In a refrigeration system where refrigerant flows through a closed vapor cycle refrigeration circuit having an evaporator, a controlled displacement compressor, a condenser and a thermostatic expansion device, a control system for regulating the refrigerant flow rate through the evaporator to vary the evaporator boiling pressure, and consequently the evaporator capacity, in order to maintain a substantially constant desired temperature in a space to which cooled air is supplied by the refirgeration system, comprising:
   means, including a temperature sensor located in the space to be temperature controlled, for providing a space temperature signal representing the actual ambient temperature therein;
   means, including an adjustable device, for providing a temperature set point signal representing the desired temperature for the temperature controlled space;
   means responsive to said space temperature signal and to said temperature set point signal for providing a pressure control point signal which represents a desired evaporator boiling pressure, referenced with respect to a predetermined desired minimum evaporator boiling pressure;
   means for providing an evaporator pressure signal representing the actual pressure of the refrigerant flowing through the evaporator;
   means responsive to said pressure control point signal and to said evaporator pressure signal for providing an error signal which varies as a function of the difference between the desired control point pressure and the actual evaporator pressure;
   and means reponsive to said error signal for varying the displacement of the controlled displacement compressor to modulate the refrigerant flowing through the evaporator to establish the evaporator boiling pressure at the desired control point, thereby to maintain the controlled space at the desired temperature.

7. A control system according to claim 6 in which said means for providing said evaporator pressure signal includes a temperature sensor positioned adjacent to the evaporator inlet, the evaporator inlet temperature reflecting the evaporator pressure.

8. A control system according to claim 6 and including means for preventing the pressure of the refrigerant in the evaporator from dropping below said predetermined desired minimum evaporator boiling pressure.

9. A control system according to claim 6 and including means for providing a first reference signal representing said predetermined desired minimum evaporator boiling pressure, and wherein, during periods when the actual space temperature is substantially greater than the desired space temperature, said first reference signal limits said error signal to restrict the displacement of the compressor to a level that results in the evaporator boiling pressure dropping only to the desired minimum.

10. A control system according to claim 9 in which said error signal is produced by a differential amplifier to one input of which is applied said first reference signal, the other input of said differential amplifier receiving the sum of said pressure control point signal and said evaporator pressure signal.

11. A control system according to claim 6 wherein said pressure control point signal is produced by an integrator which compares said space temperature signal and said temperature set point signal.

12. A control system according to claim 6 and including means, operable during steady state conditions when the controlled space is established at the desired temperature and the heat load on the evaporator is unchanged, for automatically maintaining the boiling pressure of the refrigerant in the evaporator at the desired control point pressure.

13. A control system according to claim 6 wherein said means for providing said error signal also causes said error signal to vary as a function of the difference between the desired control point pressure and the actual evaporator pressure, the refrigerant flow being controlled in accordance with the difference between the desired and actual evaporator pressures to automatically maintain the evaporator boiling pressure at the desired control point during steady state conditions when the heat load on the evaporator is unchanged.

14. A control system according to claim 6 and including a protection circuit for decreasing the displacement of the compressor in the event that the pressure of the refrigerant in the evaporator drops to a predetermined absolute minimum level.

15. A control system according to claim 6 wherein the refrigeration system is an automotive air-conditioning system in a vehicle, the compressor being driven by the vehicle's engine, and wherein a protection circuit, which operates in response to said evaporator pressure signal, prevents the evaporator boiling pressure from decreasing below a predetermined absolute minimum level which could otherwise occur as a result of high speed operation of the compressor during periods of sudden increases in engine speed.

16. A control system according to claim 15 wherein said protection circuit, in response to the evaporator boiling pressure dropping to said predetermined absolute minimum level, overrides said error signal and causes the compressor to reduce its displacement to the extent necessary to decrease the refrigerant flow rate as required to prevent the evaporator boiling pressure from decreasing below said absolute minimum level.

17. A control system according to claim 16 wherein said protection circuit includes means for providing a second reference signal, representing said predetermined absolute minimum level, which is compared with said evaporator pressure signal in a comparator to produce a control signal which renders said error signal ineffective and causes the compressor to decrease the refrigerant flow rate.

18. A control system according to claim 6 and including an additional protection circuit, which operates in response to said evaporator signal, for preventing the evaporator boiling pressure from exceeding a predetermined maximum allowable level to insure proper dehumidification of the cooled air even when the heat load is relatively small.

19. A control system according to claim 18 wherein said additional protection circuit, in response to the evaporator boiling pressure increasing to said predetermined maximum allowable level, overrides said error signal and causes the compressor to operate with a displacement as required to hold the evaporator boiling pressure at said predetermined maximum level.

20. A control system according to claim 19 wherein said additional protection circuit includes means for providing a third reference signal, representing said predetermined maximum allowable level, which is compared with said evaporator pressure signal in a comparator to produce another control signal which renders said error signal ineffective and causes the compressor to operate with the displacement required to hold the boiling pressure at said predetermined maximum level.

21. A control system according to claim 6 in which said error signal determines the duty cycle of a pulse width modulated signal which in turn controls the displacement of the compressor, the displacement being directly proportional to the duty cycle.

22. A control system according to claim 21 in which said error signal is applied to an integrator the output of which is applied to a comparator which also receives a triangular shaped signal, said pulses width modulated signal being produced at the output of said comparator.

23. A control system according to claim 21 wherein said pulse width modulated signal controls a valve for varying a pressure within the compressor, which pressure in turn determines the compressor displacement.

* * * * *